March 24, 1925.   1,530,586
A. D. WACK
COMBINED ORANGE, LEMON, AND LIME SQUEEZER
Filed Aug. 18, 1924
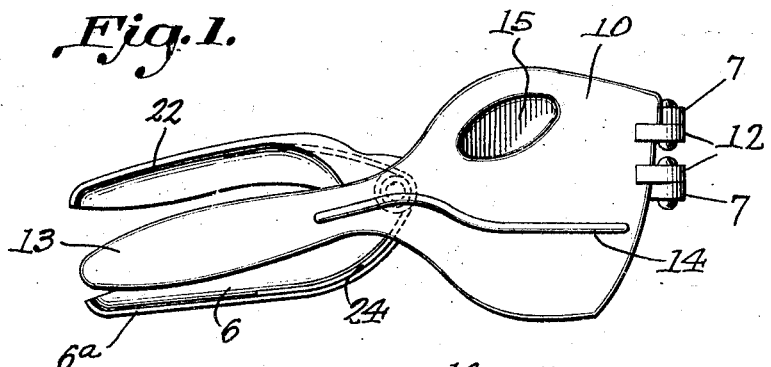
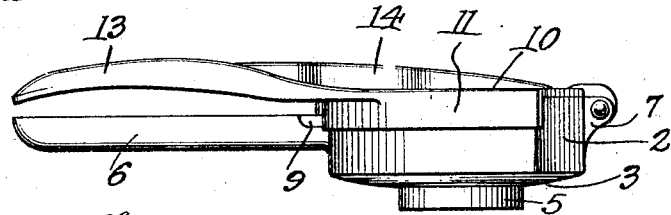
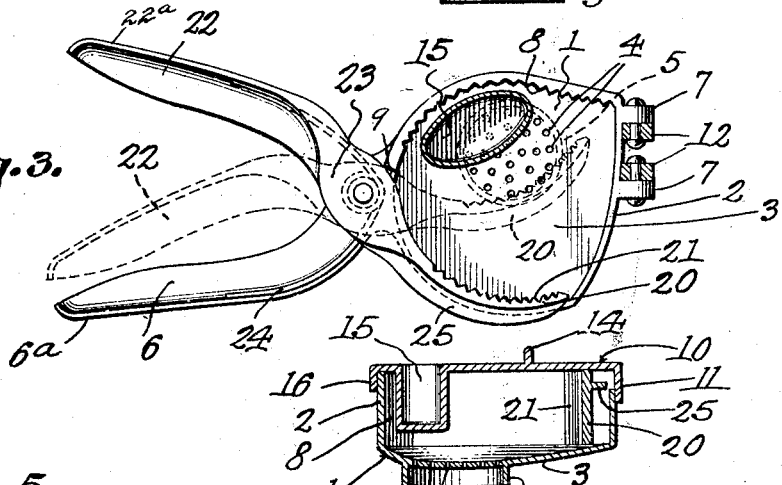
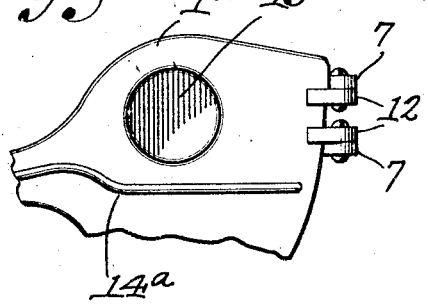
Inventor
A. D. Wack
By C. A. Snow & Co
Attorneys Patented Mar. 24, 1925.

1,530,586

UNITED STATES PATENT OFFICE.

ARTHUR DARBY WACK, OF ST. LOUIS, MISSOURI, ASSIGNOR TO MARGARET T. WACK, OF ST. LOUIS, MISSOURI.

COMBINED ORANGE, LEMON, AND LIME SQUEEZER.

Application filed August 18, 1924. Serial No. 732,826.

*To all whom it may concern:*

Be it known that I, ARTHUR DARBY WACK, a citizen of the United States, residing at St. Louis, State of Missouri, have invented a new and useful Combined Orange, Lemon, and Lime Squeezer, of which the following is a specification.

This invention relates to kitchen utensils and more particularly to what may be termed combined orange, lemon and lime squeezers.

The object of the invention is to construct a device of this character so as to eliminate the waste of the juice by confining it to the squeezer until released through the bottom into the article intended to receive it.

Another object is to so construct a device of this character that it will have a combined squeezing and a pressing action in planes at right angles to each other and thus adapt it to entirely remove all juice from the fruit and direct it through the bottom of the squeezer into the container designed to receive it and which will turn the fruit inside out preventing the peeling from coming in direct contact with the juice.

Another object is to so construct a squeezer of this character that it will drain all the juice out of the fruit in one operation.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a plan view of a squeezer constructed in accordance with this invention ready for use;

Fig. 2 is an edge view thereof;

Fig. 3 is a plan view with the top removed, the knuckle which connects the top being shown in section;

Fig. 4 is a transverse section; and

Fig. 5 is a detail perspective of a slightly different form of the invention.

In the embodiment illustrated pivotally connected jaw members 1 and 10 are shown, the member 1 constituting the fruit holding and juice retaining member, the member 10 forming the top therefor which shuts down over said member, said members having cooperating flanges around them shown at 2 and 11 respectively to insure a tight fit and prevent the splashing out of the juice during the squeezing operation. The flange 11 of the top member fits down over the flange 2 of the bottom member as is shown clearly in Fig. 4.

The fruit holding member 1 is substantially cup-shaped in form having a concave bottom 3 which slopes downwardly toward apertures 4 through which the juice squeezed out of the fruit is designed to pass. An annular flange 5 depends from the bottom of the member 1 around the apertured portion thereof and is designed to fit into a vessel for receiving the juice squeezed out of the fruit. A curved handle 6 extends laterally from one side of the member 1 while at the side directly opposite said handle are hinge knuckles 7 to cooperate with a knuckle 12 carried by the top member 10 whereby the two members are hingedly united.

The inner face of one side wall of the member 1 is serrated or toothed as shown at 8 forming a stationary jaw which cooperates with a movable jaw 20 for squeezing the fruit in a manner presently to be described. This movable jaw 20 is also provided on its inner face with teeth 21 and is curved to conform to the upstanding flange 2 of the member 1 in which said movable jaw is mounted to operate.

The movable jaw 20 has a curved handle 22 formed integral therewith with a flat apertured portion 23 adapted to be pivotally mounted in a seat 9 formed at the inner end or the base of the handle 6. The curved jaw 20 and the handle 22 form a compound curve.

The handles 22 and 6 are provided around their outer edges with oppositely disposed flanges 6ª and 22ª respectively and against which abut the opposed ends of a spring 24 which is coiled around the pintle which connects the handle 22 with the handle 6 and which exerts its tension to normally force the movable jaw 20 away from the jaw 8.

The jaw 20 has a longitudinally extending rib 25 which reinforces and strengthens the jaw and adapts it to be made of comparatively thin metal and yet withstand the strains to which it will be subjected.

The top jaw member 10 which is hingedly connected with the member 1 as above described is equipped with a longitudinally extending handle 13 adapted to overlie the handles 22 and 6 when the jaw 10 is closed. The body portion of the top 10 has a longitudinally extending reinforcing rib 14 and is also provided with a projection 15 located at one side of the rib 14 which is designed to enter the fruit to be squeezed which is as usual cut in halves and placed in the squeezer with the cut face extending downwardly in position to receive the projection which may be either substantially ovate as shown in Figs. 1 to 4 or round as shown in Fig. 5.

The flange 11 of the top member 10 is cut away around the pivoted end thereof and partially cut away at one side as shown at 16 to adapt the top to fit snugly over the member 1 when in closed position.

In the use of this utensil the parts being connected as herein shown and described the top member 10 is opened as is also the movable jaw 20 and the lime, lemon or orange from which the juice is to be extracted is cut into halves and placed in the cup-shaped bottom member 1 between the stationary and movable jaws 8 and 20. The top 10 is then closed with the projection 15 engaging the skin side of the fruit and turning the fruit inside out.

When the jaw 10 is closed sufficiently to permit the handles 13, 22 and 6 to be gripped in one hand of the user these handles are forced together which causes the member 15 to exert a pressing action on the fruit while the jaw 20 moves in a plane at right angles thereto and squeezes the fruit between it and the stationary jaw 8 so that all or substantially all of the juice is extracted and caught in the member 1 and passes out through the apertures 4 in the bottom thereof into the vessel disposed to receive it without any splashing of the juice such as occurs with the squeezers now on the market and which avoids the loss of the juices as well as the disagreeable sprinkling of adjacent objects therewith.

It is of course understood that this utensil may be constructed of any suitable or desired material preferably of aluminum.

In Fig. 5 the depression 15ª which forms the presser is made round instead of ovate and operates to effectively press out the fruit juices.

It is of course understood that by making the device larger it may be used for grapefruit also.

I claim:—

1. A device of the class described comprising two compressing members hingedly connected at one end and having laterally extending handles at the other, said members being in the form of telescoping sections to prevent splashing of the fruit juices, one of said members having a concaved apertured bottom with a flange on its outer face surrounding the apertures in said bottom and movable means located between said members to exert a squeezing action on the fruit being treated.

2. A device of the class described comprising a substantially cup-shaped fruit receiving member, having a concaved bottom with apertures, a cover member hingedly connected to said cup-shaped member and adapted to fit over and close said cup-shaped member, said cover member having means for engaging the fruit to press it, handles extending from said members to overlie each other when the top is closed, and a squeezing member mounted in said cup-shaped member and having a handle movable laterally between the handles of the hinged members.

3. An article of the class described comprising hingedly connected cooperating pressing members having flanges to fit one within the other and completely enclose the fruit to be pressed, said members having handles adapted to overlie each other when the members are closed, the wall at one side of one of said members being serrated to form a squeezing jaw, a curved movable serrated jaw mounted to move toward and away from said fixed serrated jaw, a handle extending from said movable jaw between the handles of the hinged members, and a spring mounted to normally hold the movable jaw in open position.

4. In a lemon squeezer two members hinged to move toward and away from each other and having means to retain between them the juices extracted thereby, a movable squeezing jaw mounted between said members and made in the form of a compound curve, one end of which is toothed to form a squeezing surface and the other end extended outwardly and curved in an opposite direction to form a hand grip, and means on one of said members to cooperate with said squeezing jaw.

5. A squeezer of the class described comprising juice retaining means and a fruit presser and a squeezer operating in planes at right angles to each other.

In testimony that I claim the foregoing as my own, I have hereto affixed my signature in the presence of two witnesses.

ARTHUR DARBY WACK.

Witnesses:
 Louis C. Hunt,
 C. R. Waterman.